United States Patent [19]
Rossi et al.

[11] 3,876,722
[45] Apr. 8, 1975

[54] COPOLYMER OF $C_3$ TO $C_8$ ALPHA-OLEFIN AND $C_{22}$ TO $C_{40}$ ALPHA-OLEFIN

[75] Inventors: Albert Rossi, Jersey City; Norman Jacobson, East Brunswick; Harold N. Miller, Millington, all of N.J.

[73] Assignee: Exxon Research and Engineering Company, Linden, N.J.

[22] Filed: July 30, 1971

[21] Appl. No.: 167,866

Related U.S. Application Data
[62] Division of Ser. No. 762,372, Sept. 16, 1968, abandoned.

[52] U.S. Cl. ............... 260/683.15 D; 260/88.2 C; 260/88.2 F
[51] Int. Cl. .................. C07c 3/10; C08g 15/04
[58] Field of Search ... 260/683.15 D, 683.1, 88.2 F; 44/62, 80

[56] References Cited
UNITED STATES PATENTS

| | | | |
|---|---|---|---|
| 2,500,162 | 3/1950 | Seger et al. | 260/683.1 |
| 2,895,915 | 8/1956 | Hewett et al. | 260/88.2 F |
| 3,113,167 | 12/1963 | Sauer | 260/683.15 |
| 3,151,181 | 9/1964 | Hewett | 260/683.15 |
| 3,305,507 | 2/1967 | White et al. | 260/88.2 F |
| 3,346,662 | 10/1967 | Antonsen | 260/683.15 |
| 3,393,057 | 7/1968 | Clough et al. | 44/62 |
| 3,576,898 | 4/1971 | Blake et al. | 260/676 |
| 3,631,159 | 12/1971 | Cobbs et al. | 252/59 |
| 3,790,358 | 2/1974 | Rossi et al. | 44/62 |

FOREIGN PATENTS OR APPLICATIONS

| | | | |
|---|---|---|---|
| 6,603,483 | 9/1967 | Netherlands | 44/62 |
| 1,154,966 | 6/1969 | United Kingdom | 44/62 |

*Primary Examiner*—Paul M. Coughlan, Jr.
*Attorney, Agent, or Firm*—Frank T. Johmann

[57] ABSTRACT

Hydrocarbon polymers comprising linear $C_{18+}$alkyl side chains are added to residual fuels to improve their pour point and flow characteristics. These polymers are prepared by polymerizing $C_{20}-C_{40}$ alpha-olefins in the presence of a Ziegler-type catalyst to a number average molecular weight within the range between about 500 and 125,000. Particularly effective polymers are prepared from $C_3-C_{18}$ alpha-olefins and $C_{20}-C_{40}$ alpha-olefins.

2 Claims, No Drawings

COPOLYMER OF $C_3$ TO $C_8$ ALPHA-OLEFIN AND $C_{22}$ TO $C_{40}$ ALPHA-OLEFIN

RELATED APPLICATION

This application is a division of our Ser. No. 762,372 filed Sept. 16, 1968, now abandoned.

BACKGROUND OF THE INVENTION

1. Field of the Invention

The present invention is concerned with residual fuels having improved pour and flow characteristics. More particularly, the invention relates to a residual fuel containing, as a wax crystal modifier, a polymer of $C_{20}$ –$C_{40}$ alpha-olefins.

2. Description of the Prior Art

When petroleum oils are sufficiently cooled, there is formed a crystalline precipitate of the wax present in the oil. As the temperature is further lowered, the concentration of solid material increases, developing a gel caused by the formation of a coherent three-dimensional network of wax crystals. As a result of this crystal structure, large amounts of oil are entrained in the crystal lattice of the wax, thereby preventing its flow. The temperature which is 5°F. higher than that at which oil ceases to flow when chilled under specified conditions is referred to as the pour point.

The pour points of petroleum oil vary widely, for example, some oils solidify far below zero while others freeze at temperatures up to 80°or 120°F. by virtue of their wax content alone. It is obvious, therefore, that the pour point is critical with regard to the flow characteristics and, consequently, adversely affect the storage, mixing, pumping, etc. of such oil. Thus, pour point characteristics are significant to the design and/or operation facilities for the significant to the design and/or operation facilities for the storage, heat exchange, pumping, etc. of the oil. Naturally, an oil having a high flow point, e.g., light fuel oils having flow points above 20°F. and residual fuels having flow points above about 60°F. would provide a serious problem relative to the design of the facilities mentioned above.

Typical examples of petroleum oils which exemplify the undesirable characteristic of having high pour or flow points are the residual oils set forth in the following Table I.

While the present invention is directed to substantially all petroleum fuel oils containing components of petroleum residual oil, special reference is made to high pour point fuels, e.g., residual fuel oils boiling above about 600°F. and containing $C_{25}$–$C_{60+}$paraffins. Particular reference is made to the residuum of a North African crude identified above as Zelten residuum which contains about 20 wt. percent wax. This wax includes waxes of relatively high molecular weight, e.g., from about $C_{25}$ and greater, which give rise to a number of the above-mentioned problems, i.e., the transporting, storing, etc. of this kind of heavy oil.

However, while such Zelten residuum typifies the kind of high-wax containing oils which exemplify undesirable flow properties and the like, such residuum is, in fact, a premium oil as compared to other crude residua which have much lower pour points. This fact may be illustrated by a comparison of Zelten waxy oil with crude petroleum residua known as Aramco and Kuwait, as illustrated in the following Table II.

TABLE I

| PETROLEUM RESIDUAL OILS | | | | | | | | | |
|---|---|---|---|---|---|---|---|---|---|
| 1 | 2 | 3 | 4 | 5 | 6 | 7 | 8 | 9 | 10 |
| Location | | Libya | | | | Nigeria | | Venezuela | Sumatra |
| Field | Zelten | Ma-bruk | Raguba | Dahra | Waha | Bomu | Ebubu | Oloibiri | San Joaquin | Minas |
| Flow Points of Residual (°F.): | 105 | 110 | 97 | 95/100 | 85 | 100+ | 100+ | 100+ | 110+ | 115 |
| *°FVT Cut Point of Residual: | 680+ | 680+ | 650+ | 650+ | 650 | 650 | 650 | 650 | 650 | 650 |

*FVT = Final Vapor Temperature

TABLE II

| | Heavy Fuel Oil Inspections | | | |
|---|---|---|---|---|
| Vol. % 630° FVT In Crude Inspections on 680°FVT+ | Zelten 35 | Aramco 39 | Kuwait 37 | Target — |
| Gravity, °API | 22 | 15 | 14 | — |
| Sulfur, wt. % | 0.4 | 3.0 | 4.2 | 3.5 max. |
| Viscosity, SF at 122°F. | 65 | 110 | 340 | 40–175 |
| MNI, wt. % | 2.3 | 4.0 | 3.8 | 7 max. |
| Conradson Carbon, wt. % | 4.5 | 8–9 | 10–11 | — |
| Flow Point, °F. | 105 | 65 | 55 | 75 max. |
| Hot Filtration Sed., Wt. % | 0.01 | 0.02 | 0.02 | 0.15 max. |

The inspections shown in the foregoing Table II illustrate that the Zelten residuum is a premium product per se, as well as a valuable product for blending and for improving other heavy fuel oils due to its low sulfur content, low viscosity, low MNI (Modified Naphtha Insolubles), and low Conradson Carbon number. Furthermore, it is low in ash and vanadium content. These qualities also make Zelten crude residuum an excellent cracking stock for obtaining various valuable products, such as straight chain olefins, and the like. As presented, the column headed by the notation "Target" indicates the parameters of blends which are desirable using said Zelten residuum as a blending stock, i.e., providing the flow point can be suitably lowered. For example, it may be desirable to mix the Zelten residuum in a 50/50 mixture with the Aramco or Kuwait residuum. While such blending lowers the wax content, the flow point is generally not sufficiently reduced so as to significantly change the characteristics of the resulting mixture.

Thus, while it is found that blending of the extremely high wax-containing petroleum residual oils with other blending stocks may lower the wax content, the pour or flow point cannot be satisfactorily reduced without using further processing.

As mentioned above, because of the ability of high pour point, e.g., high wax content oils to resist the free flow at lower temperatures, their use at these conditions is very limited. Conventional dewaxing operations to reduce the pour point are not always feasible nor satisfactory, and they are usually expensive. For this reason, additives capable of lowering the pour point of these oils are required to extend their use at lower temperatures.

The use of additives to lower the pour point of mineral oils is well known. For example, a wide variety of compounds has been found to be effective as pour point depressants for middle distillates and lubricating oils. Among the best known are "Paraflow", "Santopour" and "Acryloid" and their modifications. They are prepared either by condensing aromatic compounds with long chain paraffins, such as chlorinated wax, or by condensing olefinic esters. It is generally considered that these pour depressants are effective in that in cooling an additive containing oil, the hydrocarbon chain of the additive becomes incorporated into the crystal lattice of the separated wax, while the other part of the pour depressant molecule prevents the crystals from adhering together to form a gel structure. Unfortunately, these well-known pour depressants are not effective in all petroleum base stocks, usually being effective in either middle distillates or lubricating oil fractions. However, none of these well-known pour depressants are effective in the residual fuels of the type with which this invention is concerned.

U.S. Pat. No. 3,248,186 discloses that the problems associated with the use of the residual fuel of the invention can be overcome by incorporating into the fuel a polyacylated polystyrene wherein the acyl group contains a long straight alkyl chain. This patent also discloses that additives of the type represented by wax-naphthalene condensates, $C_{22}$ alkyl polystyrene, polyvinyl stearate, etc. are not effective in the residual oils of this invention. Further, this patent shows that n—$C_{22}$ acyl polystyrene is effective in the residual fuel whereas n—$C_{22}$ alkyl polystyrene is ineffective, suggesting that this difference in effectiveness is due to the type of side chain involved, i.e., acyl vs. alkyl, since the number of carbon atoms in the side chain is the same. Actually, the degree of effectiveness of a polymeric pour depressant appears to be somehow related to not only the type of side chain involved but also to the molecular weight of the polymer and the makeup of the polymer backbone and it cannot be predicted with certainty whether an untried class of polymers will improve the flow characteristics of a particular petroleum fraction. In accordance with this invention, it has been found that a new class of polymeric additives prepared from long chain alpha-olefins are very effective pour depressants and flow improvers for fuels containing residual oil components.

SUMMARY OF THE INVENTION

Residual fuels having improved flow characteristics are prepared by incorporating into the fuel from about 0.001 to 2.0 wt. percent based upon fuel to be treated, preferably 0.01 to 1.0 wt. percent of an oil-soluble polymer comprising at least 20 wt. percent of a $C_{20}$—$C_{40}$ alpha-olefin, said polymer having a number average molecular weight in the range of about 500 to 125,000, preferably about 1000 to about 40,000 as measured by Vapor Phase Osmometry (VPO).

The $C_{20}$—$C_{40}$ alpha-olefin monomer which is used to prepare the polymer of the invention may be represented by the following general formula: $H_2C=CHR$ wherein R is a substantially linear aliphatic hydrocarbon radical containing from 18 to 38 carbon atoms. It is preferred, however, that R have the formula: $CH_3$—$(CH_2)_n$—$CH_2$— wherein n is a whole number within the range between about 16 and 36, more preferably within the range between about 18 and 26. The term "substantially linear" is used herein to denote those aliphatic side chains, i.e., R, which contain no more than one lower alkyl side chain such as methyl, ethyl, etc., in the radical and wherein said lower alkyl side chain, when present in the radical, is located at a position such that R has a linear portion containing at least 18 carbon atoms. Examples of such monomers include, among others, n-eicosene-1, 3-methyl docosene-1, n-tetracosene-1, 3-methyl tetracosene-1, n-hexacosene-1, n-triacontene-1 and the like.

Polymers prepared from the aforedescribed $C_{20}$—$C_{40}$ alpha-olefins when blended with fuels containing residual oils are effective for lowering the pour point and improving the flowability thereof. It has unexpectedly been found, however, that the polymers having the greatest ability to improve the flow characteristics of fuels containing residual fuel oil components are prepared from the aforedescribed $C_{20}$—$C_{40}$ alpha-olefins and certain lower alpha-olefins. While not known with certainty, this unexpected flow improvement may be due to the fact that copolymerization with lower alpha-olefins results in a polymer or lower thereby improving oil solubility and ability to co-crystallize with the wax to result in smaller wax crystals. Accordingly, the preferred polymer of this invention comprises 0 to 80 wt. percent of a $C_3$—$C_{18}$ alpha-olefin and 20 to 100 wt. percent of the aforedescribed $C_{20}$—$C_{40}$ alpha-olefin. Of these, copolymers containing 4 to 50 wt. percent of a $C_3$—$C_8$ alpha-olefin and 50 to 96 wt. percent of a linear $C_{22}$—$C_{40}$ alpha-olefin are particularly effective. An especially preferred polymer comprises 20 to 40 wt. percent of a $C_4$—$C_6$ alpha-olefin and 60–80 wt. percent of a $C_{22}$—$C_{30}$ alpha-olefin.

The $C_3$—$C_{18}$ alpha-olefins which are polymerized with the aforedescribed $C_{20}$—$C_{40}$ alpha-olefins may be represented by the following general formula: $H_2C=CHR'$ wherein R' is a hydrocarbon radical containing from 1 to 16 carbon atoms. Since the lower alpha-olefin apparently serves only to disrupt the degree of order of the polymer, there appears to be no criticality as to the configuration of R'. Accordingly, R' may be an alkyl, aralkyl, aryl, alkylaryl or cycloaliphatic group. Examples of such monomers include propylene, butene-1, hexene-1, octene-1, decene-1, 3-methyl decene-1, tetradecene-1, styrene and styrene derivatives such as p-methyl styrene, p-isopropyl styrene, alpha-methyl styrene, etc.

The aforedescribed $C_{20}$–$C_{40}$ alpha-olefins may be polymerized with various other monomers. For example, effective copolymers comprise 20 to 100 wt. percent of a $C_{20}$–$C_{40}$ alpha-olefin of the invention and 0 to 80 wt. percent of a polymerizable $C_6$–$C_{28}$ diolefin. Similarly, the polymers of the invention may comprise 20 to 100 wt. percent of the aforedescribed $C_{20}$–$C_{40}$ alpha-olefin, 0 to 80 wt. percent of the aforedescribed $C_3$–$C_{18}$ alpha-olefin and 0 to 80 wt. percent of a polymerizable $C_6$–$C_{28}$ diolefin. These diolefins which are useful for polymerization with the aforedescribed alpha-olefins include the bicyclic, alicyclic or aliphatic nonconjugated diolefins containing from about 6 to about 28 carbon atoms, preferably from about 6 to 12 carbon atoms. Nonlimiting examples of suitable monomers include 1,5-cyclooctadiene, methylene norbornene, dimethylene norbornene, 1,5-hexadiene, dicyclopentadiene, 5-vinyl-2-norbornene, 1,5-cyclodecadiene, 2,4-dimethyl-2,7-octadiene, 3(2-methyl-1-propenyl) cyclopentene, 1,5-octadecadiene, and the like.

The polymers of this invention may be conventionally prepared by polymerizing the monomers under relatively mild conditions of temperature and pressure in the presence of a Ziegler-type catalyst, i.e., a mixture of a compound derived from a Group IV, V or VI metal of the Periodic Table in combination with an organo metallic compound of a Group I, II, or III metal of the Periodic Table wherein the amount of the compound derived from a Group IV – VI metal may range from 0.01 to 2.0 moles per mole of the organo metallic compound.

Effective catalysts for polymerizing the monomers of the invention include the following combinations: aluminum triisobutyl and vanadium trichloride; aluminum triisobutyl, aluminum chloride, and vanadium trichloride; vanadium tetrachloride and aluminum trihexyl; vanadium trichloride and aluminum trihexyl; vanadium triacetylacetonate and aluminum diethyl chloride; titanium tetrachloride and aluminum trihexyl; vanadium trichloride and aluminum trihexyl; titanium trichloride and aluminum trihexyl; titanium dichloride and aluminum trihexyl; etc.

The polymerization is usually carried out by mixing the catalyst components in an inert diluent such as a hydrocarbon solvent, e.g., hexane, benzene, toluene, xylene, heptane, etc., and then adding the monomers into the catalyst mixture at atmospheric or superatmospheric pressures and temperatures within the range between about 50° and 180°F. Usually atmospheric pressure is employed when polymerizing the monomers containing more than 4 carbon atoms in the molecule and elevated pressures are used for the more volatile $C_3$–$C_4$ alpha-olefins. The time of reaction will depend upon, and is interrelated to, the temperature of the reaction, the choice of catalyst, and the pressure employed. In general, however, ½ to 5 hours will complete the reaction.

Usually, based upon 100 parts by weight of polymer to be produced, about 120 to 100,000 parts by weight of solvent, and about 0.05 to 5 parts by weight of catalyst will be used in the polymerization.

The hydrocarbon fuels which are treated with the polymers of this invention include those fuel oils containing 20 to 100 percent by weight of a petroleum residual fuel oil having an atmospheric boiling point above about 600°FVT (°F. Vapor Temperature). In general, these residual oil-containing fuels will have atmospheric boiling points above about 500°FVT and will contain waxes ranging from $C_{25}$ to $C_{60+}$ paraffins. The invention is particularly concerned with those residual oil-containing fuels having a ASTM pour point above about 50°F. Specific examples of these fuels include, among others, marine diesel fuels, Bucker C fuel oil and the Numbers 4, 5 and 6 fuel oils as defined by ASTM D-396-67 and amendments thereto.

The polymers of the invention may be used alone as the sole additive, or in combination with other additives such as corrosion inhibitors, antioxidants, rust inhibitors, combustion improvers, and sludge dispersants and/or inhibitors, etc.

The invention will be further understood by reference to the following examples which include preferred embodiments of the invention.

DESCRIPTION OF THE PREFERRED EMBODIMENTS

EXAMPLE 1

A polymer of $C_{22}$–$C_{28}$ alpha-olefins was prepared as follows:

Into a 500 ml. four-neck flask fitted with a mechanical stirrer, heating mantle, thermometer, condenser and inlet were charged under anhydrous conditions, 0.21 gram of $TiCl_3 \cdot 1/3 AlCl_3$, 30 milliliters of toluene as solvent and 0.4 gram of $Al(n-C_3H_8)_3$. After stirring the catalyst-solvent mixture at room temperature for about 30 minutes, the mixture was heated to about 75°C. under a nitrogen blanket and 20 grams of an n-$C_{22}$–$C_{28}$ alpha-olefin mixture dissolved in 180 grams of toluene was added thereto. The olefin mixture contained 32 wt. percent n-$C_{22}$ alpha-olefin, 35 wt. percent n-$C_{24}$ alpha-olefin, 22 wt. percent n-$C_{26}$ alpha-olefin, 7.8 wt. percent n-$C_{28}$ alpha-olefin and 3.2 wt. percent $C_{30+}$ alpha-olefins (wt. percent based on polymerizable material; 42 wt. percent inert material present). After addition of the alpha-olefin solution was completed, the reaction mixture was heated at 70°–80°C. for about 2 hours, whereupon 1 ml. of isopropyl alcohol was added to stop the reaction. The product mixture was then cooled to room temperature and thereafter mixed with about 5 volumes of methanol to precipitate the solid $C_{22}$–$C_{28}$ alpha-olefin polymer which was then filtered off and dried for about 12 hours in an oven maintained at about 60°C. and 120 mm. psig. The resulting polymer weighed 9 grams.

EXAMPLE 2

A polymer of propylene and $C_{22}$–$C_{28}$ alpha-olefins was prepared in the following manner:

A 150 cc. stirred autoclave was charged under anhydrous conditions with 0.4 gram of triethyl aluminum, i.e., $Al(C_2H_5)_3$, 22 grams of xylene solvent and 0.42 gram of aluminum activated titanium trichloride, i.e., $TiCl_3 \cdot 1/3AlCl_3$, with a dry nitrogen blanket. The catalyst-solvent mixture was then stirred at 70°–80°C. for 2 hours. 82.2 grams of a normal hexane solution containing 8 wt. percent of the $C_{22}$–$C_{28}$ alpha-olefin mixture described in Example 1 was then added to the stirred reactor contents. After addition of the $C_{22}$–$C_{28}$ alpha-olefin solution was completed, propylene was pressured into the autoclave until the pressure was raised from atmospheric to 6 psig. Propylene pressure was maintained in the reactor for 2 hours at a temperature of 70°–80°C. Then, after adding 0.9 gram of isopropanol to kill the reaction, the reactor was opened and the contents diluted with hexane and added to 4000 ml. of methanol to precipitate the polymer product. The empty reactor was rinsed with 30 ml. of n-hexane which was also added to the methanol. The precipitated product was then dried for about 12 hours in an oven maintained at 60°C. and 120 mm. pressure. The propylene/$C_{22}$–$C_{28}$ alpha-olefin polymer product weighed 5.2 grams and had a number average molecular weight of 1890 as measured by Vapor Phase Osmometry (VOP).

EXAMPLE 3

A polymer of butene-1 and n-$C_{22}$ alpha-olefin was prepared by reacting 4 grams of liquefied butene-1 in a stirred glass closed reactor containing 10 grams of n-$C_{22}$ alpha-olefin dissolved in a catalyst-solvent mixture consisting of 22.5 ml. of toleuene and 90 ml. of n-heptane, 0.4 grams of Al(n-$C_3H_8$)$_3$ and 0.2 gram of TiCl$_3$·1/3AlCl$_3$, which catalyst-solvent mixture was prepared in accordance with the method of Example 1. The polymerization was then carried out by reacting the reactants at 70°–80°C. for about 4 hours. Termination of the reaction and recovery of the product was then carried out in accordance with the steps given in the above examples. The butene-1/docosene-1 copolymer product weighed 7.8 grams and had a number average molecular weight of about 3350 as measured by Vapor Phase Osmometry.

EXAMPLE 4

A number of polymers of lower alpha-olefins, higher alpha-olefins and cyclic olefins were prepared using the same general procedure as described in the above examples. In these runs, polymers prepared only from olefins containing 6 or more carbon atoms were made using the general process conditions set forth in Example 1, with the exception that different olefin-monomers and amounts were employed. Similarly, polymers prepared from propylene were made using the process described in Example 2. Polymers prepared from butene-1 were made using the process described in Example 3. The resulting polymers were then tested in a North African residual fuel known as Brega residuum and having ASTM upper and lower pour points of 105° and 105°F., respectively, and an initial atmospheric boiling point of 650°FVT. The residual fuel-polymer blends were tested for ASTM pour depression since this is a measure of the ability of the polymer additive to improve the flow characteristics of the fuel. The results are given below in the following table.

TABLE

EVALUATION OF POLYMERIC ADDITIVES IN BREGA RESIDUAL FUEL

| Additive, 0.15 Wt. % Concentration | ASTM Pour Point,[1]°F. Upper | Lower |
|---|---|---|
| None | 105 | 105 |
| Octadecene-1 homopolymer[2] | 105 | 105 |
| Octadecene-1/butene-1 copolymer[3] | 100 | 95 |
| Eicosene-1 homopolymer[4] | 100 | 90 |
| Docosene-1 homopolymer[5] | 95 | 85 |
| Docosene-1/butene-1 copolymer[6] | 70 | 55 |
| Docosene-1/hexene-1 copolymer[7] | 95 | 65 |
| Docosene-1/hexene-1/MNB terpolymer[8] | 95 | 70 |
| Docosene-1/styrene copolymer[9] | 90 | 60 |
| $C_{22}$–$C_{28}$ alpha-olefin polymer[10] | 100 | 95 |
| $C_{22}$–$C_{28}$ alpha-olefin/propylene polymer[11] | 80 | 55 |
| $C_{22}$–$C_{28}$ alpha-olefin/hexene-1 polymer[12] | 95 | 50 |
| $C_{22}$–$C_{28}$ alpha-olefin/styrene polymer[13] | 95 | 65 |
| $C_{22}$–$C_{28}$ alpha-olefin/4-methyl-pentene-1 polymer[14] | 80 | 55 |

[1] ASTM D-97, special procedure for black oils.
[2] Number average molecular weight of about 2760 (VPO).
[3] Copolymer prepared from 70 wt. % octadecene-1 and 30 wt. % butene-1 and having a number average molecular weight of about 9300 (VPO).
[4] Number average molecular weight of about 2110 (VPO).
[5] Number average molecular weight of about 7180 (VPO).
[6] Copolymer prepared from 67 wt. % docosene-1 and 33 wt. % butene-1 and having a number average molecular weight of about 3350 (VPO).
[7] Copolymer prepared from 40 wt. % docosene-1 and 60 wt. % hexene-1 and having a number average molecular weight of about 5530 (VPO).
[8] Terpolymer prepared from 56 wt. % docosene-1, 36 wt. % hexene-1 and 8 wt. % methylene norbornene (MNB) and having a number average molecular weight of about 3640 (VPO).
[9] Copolymer prepared from 72 wt. % docosene-1 and 28 wt. % styrene and having a number average molecular weight of about 8500 (VPO).
[10] Polymer of Example 1.
[11] Polymer of Example 2.
[12] Polymer prepared from 59 wt. % of $C_{22}$–$C_{28}$ alpha-olefin mixture described in Example 1 and 41 wt. % of hexene-1 and having a number average molecular weight of about 2820 (VPO).
[13] Polymer prepared from 72 wt. % of $C_{22}$–$C_{28}$ alpha-olefin mixture described in Example 1 and 28 wt. % styrene and having a number average molecular weight of about 8500 (VPO).
[14] Polymer prepared from 75 wt. % of $C_{22}$14 $C_{28}$ alpha-olefin mixture described in Example 1 and 25 wt. % of 4-methylpentene-1.

It can be seen from the above data that polymers prepared from alpha-olefins containing at least 20 carbon atoms in the molecule are effective for lowering the pour point and thus increasing the flowability of residual fuels. Of particular interest, is the surprising discovery that the effectiveness of these $C_{20+}$alpha-olefin polymers is significantly improved by incorporating lower alpha-olefins, such as propylene, butene-1, hexene-1, etc., into the polymer molecule. For example, referring to the above Table, it is seen that polymers prepared only from $C_{22}$–$C_{28}$ alpha-olefins are substantially less effective than polymers prepared from $C_3$–$C_6$ alpha-olefins and the $C_{22}$–$C_{28}$ alpha-olefins. Similarly, copolymers of docosene-1 with lower alpha-olefins are more effective than homopolymers of docosene-1. While not known with certainty, this unexpected improvement is believed to be due to the disrupting effect which the lower alpha-olefins have on the order of the polymer. Also, as is illustrated in the above Table, non-linear olefins, e.g., styrene, 4-methyl-pentene-1, cyclic-dienes, etc., may be advantageously polymerized with the higher olefins.

it is not intended that this invention be limited to the specific examples presented by way of illustration. The scope of the invention is limited by the appended claims.

What is claimed is:

1. An oil soluble copolymer having a number average molecular weight of about 1,000 to 40,000 consisting essentially of about 20 to 40 weight percent of a $C_4$—$C_6$ alpha-olefin of the formula $H_2C=CHR'$ wherein R' is a straight chain alkyl group and 60 to 80 weight percent of a $C_{22}$—$C_{30}$ alpha-olefin of the formula $H_2C=CHR$ wherein R is a stright chain alkyl group, wherein said copolymer is prepared by copolymerizing said olefins at a temperature in the range of about 50° to 180°C. using a Ziegler catalyst comprising a 0.01 to 2 molar proportion of a compound of a Group IV to VI metal per a molar proportion of an organometallic compound of a Group I to III metal.

2. A copolymer according to claim 1 wherein said copolymer is a copolymer of docosene-1 and butene-1.

* * * * *